Oct. 7, 1952 J. R. SNYDER ET AL 2,613,057
SEAL AND SWIVEL MOUNTING
Filed Oct. 24, 1945
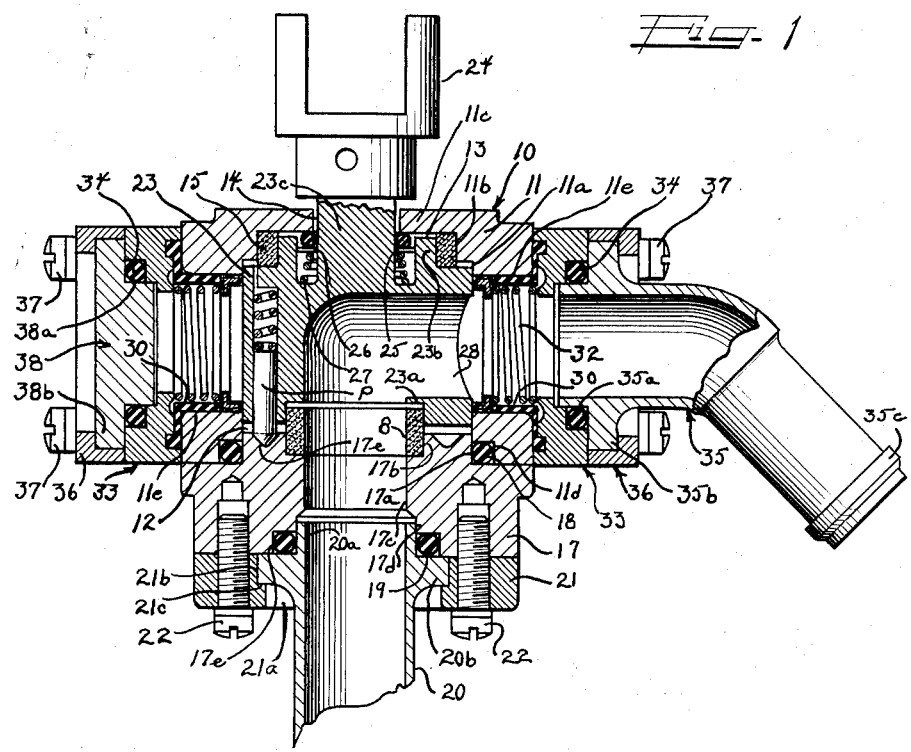
Fig. 1
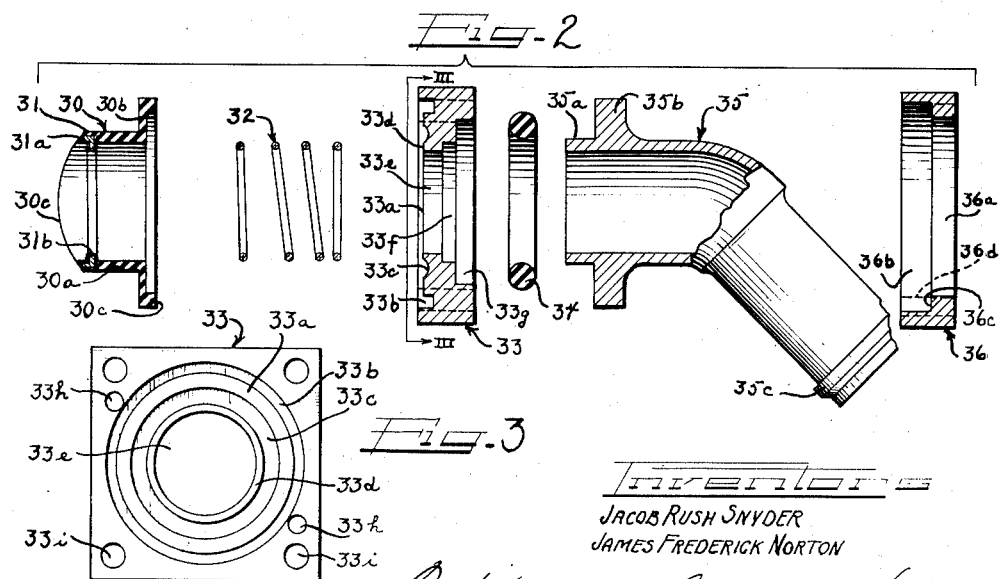
Fig. 2
Fig. 3
Inventors
JACOB RUSH SNYDER
JAMES FREDERICK NORTON Patented Oct. 7, 1952

2,613,057

UNITED STATES PATENT OFFICE 2,613,057

SEAL AND SWIVEL MOUNTING

Jacob Rush Snyder, Cleveland, and James Frederick Norton, Cleveland Heights, Ohio, assignors to Thompson Products, Inc., Cleveland, Ohio, a corporation of Ohio Application October 24, 1945, Serial No. 624,242

3 Claims. (Cl. 251—103)

This invention relates to mountings which swively support one part in sealed relation to another part.

Specifically, the invention deals with a combination seal and swivel mounting for rotary plug type fluid control devices such as plug valves.

In our copending application Serial No. 573,958 filed January 22, 1945, now Patent No. 2,417,400 of which the present application is a continuation-in-part, there is disclosed and claimed a combination seal and gasket assembly especially adapted for simultaneously sealing the ports in a valve body and for sealing nipples in fixed relation to the valve body.

The present invention now provides a combination seal and swivel mounting especially useful in fluid control devices such as plug type selector valves or the like wherein a combination seal and gasket of the type disclosed in our parent application Serial No. 573,958 above referred to, is utilized to seal the ports of the valve but wherein the fixed nipple disclosed in the parent application is replaced with a mounting block and cap assembly for swively supporting the nipple. The mounting block is recessed in its outer face to provide a chamber for an O ring seal so that the nipple, although swively mounted, will always be in sealed relation with the block. The block, in turn, is always in sealed relation with the valve body through the media of the gasket portion of the port seal. The mounting block is also recessed on its opposite face to receive a bead around the outer end of the gasket portion of the port seal and is additionally recessed to receive a movable portion of the port seal adjacent the gasket portion of the seal for accommodating movement of the port seal.

It is, then, an object of the present invention to provide a combination seal and swivel mounting for nipples of valves utilizing a gasket and port seal assembly of our parent application Serial No. 573,958 filed January 22, 1945.

It is a further object of this invention to provide a seal and swivel mounting embodying a mounting block recessed on its opposed faces to accommodate different types of seals.

A further object of this invention is to provide a seal and swivel assembly for the nipples of selector valves or the like which serves an additional function of securing a valve port seal in operative relation to a valve housing.

A specific object of this invention is to provide a swivel mounting for selector valves or other fluid flow control devices which serves a dual function of cooperating with a valve port seal and a valve nipple seal while holding the nipple in swivel relationship with the valve body.

A further specific object of this invention is to provide a sealed swivel mounting assembly for the nipples of fluid flow control valves.

A still further specific object of this invention is to provide a swivel mounting for the nipples of selector valves or the like fluid flow control devices whereby the nipples can readily be replaced with other parts such as closure plugs or the like, without disturbing the port seal of the valve.

Other and further objects of this invention will be apparent to those skilled in the art from the following detailed description of the annexed sheet of drawings which, by way of a preferred example only, illustrates one embodiment of the invention.

On the drawings:

Figure 1 is a vertical cross-sectional view, with parts in elevation, and with parts broken away, of a selector valve equipped with the seal and swivel mountings of this invention.

Figure 2 is an exploded longitudinal cross-sectional view of the parts for the seal and swivel mountings of this invention illustrating the sequence in which the parts are assembled.

Figure 3 is a plan view of the mounting block for the seal and swivel mounting of this invention taken along the line III—III of Figure 2.

As shown on the drawings:

As shown in Figure 1 the reference numeral 10 designates generally a selector valve having a body 11 with a cylindrical bore 11a extending inwardly from the bottom face thereof to define a valve-operating chamber 12. The bore 11a is counterbored at 11b to provide a smaller diameter recess 13 above the valve-operating chamber 12. This recess 13 is topped by the top end wall 11c of the body 11. The end wall 11c is centrally apertured at 14. A graphitic carbon or other suitable composition bearing ring 15 is seated in the recess 13 in snug seating engagement with the wall of the counterbore 11b.

A cover 17 is secured to the body 11 for closing the open end of the bore 11a. Bolts (not shown) secure the cover to the body 11. The bore 11a is counterbored at 11d in the mouth thereof to provide a recess for an O ring seal 18 to provide a sealing gasket for the cover 17. The cover 17 has a pilot portion 17a projecting into the bore 11a of the body 11. This pilot portion 17a engages the O ring 18 in sealing relation therewith and has a recessed central portion 17b receiving a bearing ring 8 of the same composition as the ring 15 of smaller diameter than the ring 15. The bearing ring 8 projects above the top of the cap 17 into the central portion of the chamber 12. The cap has a bore 17c of the same diameter as the inside diameter of the bearing ring 8 extending from the bearing ring to a counterbored larger diameter outer end portion 17d. The counterbore 17d, in turn, is further counterbored at 17e around the mouth thereof to provide a recess for an O ring seal 19. A nipple 20 has a tubular end portion 20a extending into the counterbore 17d in sealing engagement with the O ring 19. A flange 20b on the nipple overlies the end face of the body 17 and is also in sealing engagement with the O ring 19.

A cap ring 21 is secured on the end face of the body by means of cap screws 22. The ring 21 has a bore 21a therethrough counterbored at 21b to receive the flange 20b of the nipple and provide a shoulder 21c overlying the flange for securing the nipple in swivel relationship with the cap 17. The O ring 19 will seal the nipple 20 to the cap 17 but will permit rotation of the nipple about its own axis relative to the cap.

A valve plug 23 is mounted in the operating chamber 12 of the casing 11 on the bearings 15 and 8. Thus the plug 23 has a recess 23a in its bottom face receiving the bearing ring 8 therein in bearing relation with the side wall of the recess. The top of the plug 23 has a circular flange 23b projecting into the bearing ring 15 in bearing engagement therewith.

The plug 23 is smaller than the bore 11a of the body 11 and the bearing rings 15 and 8 hold the plug in spaced relation from the bore wall to "float" the plug in the body. The peripheral wall of the plug thus will not become roughened or scratched by the body as it is rotated therein.

The plug 23 carries a spring-pressed pin P for selective seating in recesses 17e in the cap 17 to serve as a position finder and to hold the plug in selected position.

A shank portion or stem 23c of the plug 23 projects through the aperture 14 of the top wall 11b of the body and receives a yoke member 24 thereon for driving attachment with a prime mover, an operating rod, a handle, or the like (not shown). An O ring 25 surrounds the stem 23c in the recess 13 of the body member 11 and is bottomed by a washer 26. The washer 26 is spring-pressed by a spring 27 to urge the O ring 25 against the top wall 11c of the body for sealing the stem 23c of the plug to prevent leakage through the aperture 14.

The body 11 has bores 11e in the side walls thereof providing ports communicating with the operating chamber 12. The plug valve 23 has an L-shaped passageway 28 therein extending through the side wall thereof and through the recess 23a thereof for selectively connecting the ports provided by the bores 11e with the passageway through the bearing ring 8, bore 17c and nipple 20.

The ports provided by the bores 11e are equipped with gasket-type seals disclosed and claimed in our parent application Serial No. 573,958. These seals, as best shown in Figure 2, include a rubber sleeve 30 with a tubular portion 30a, sized for snug sliding fit in the bore 11e, and an outturned flange 30b at one end thereof for overlying the side face of the body 11, to provide a gasket.

The free end of the tubular portion 30a has a metal ring 31 embedded therein. This metal ring has a cylindrically concave or dished end face 31a facing the free end face of the tubular portion and covered with the rubber of the tubular portion to provide an active sealing end face 30c which is resiliently deformable but which is rigidly backed by the rigid face 31a of the ring. The ring also has an inwardly projecting flange 31b extending into the tubular portion 30a of the rubber member to provide an abutment for a coil spring 32 which is compressed in the member 30 for urging the end face 30c thereof against the periphery of the plug 23.

In accordance with the present invention the flange or gasket-defining portion 30b of the seal member 30 has an axially outward extending bead 30c around the periphery thereof. A mounting block 33 composed of metal, plastic, or other rigid material has a first end face confronting the side wall of the body 11 recessed at 33a to receive the flange portion 30b of the seal member 30 and having an annular deeper recessed portion or groove 33b receiving the bead 30c of the member 30. The mounting block also has a rounded groove or recess 33c in the bottom of the recess 33a thereof positioned to receive that portion of the seal member 30 adjacent the junction between the tubular portion 30a and the flange 30b for accommodating outward movement of the tubular portion 30a in the event of expansion thereof or variations in tolerance limits. As shown in Figure 1, the mouths of the bores 11e are rounded to accommodate inward movement of the tubular portion 30a of the seal member 30 in the event of shrinkage of the member or variations in tolerance conditions. This arrangement provides a sliding seal which will always have its active end face 30c in sealing engagement with the periphery of the plug valve 23. The coil spring 32 is bottomed on the block 33 in the recessed end face 33a thereof adjacent the inner diameter of the groove 33c. Thus a flat surface 33d on the bottom of the recess 33a is provided for abutting the outer end of the coil spring 32.

The block 33 has a stepped bore 33e therethrough with the smallest bore portion extending outwardly from the recessed face 33a thereof. The bore 33e is counterbored at 33f and 33g to provide shouldered recesses. The recess provided by the counterbore 33f is larger than the recess provided by the bore 33e while the recess provided by the counterbore 33g is larger than the recess provided by the counterbore 33f. The counterbore 33g extends inwardly from the flat end face of the block opposite the recessed end face 33a.

As best shown in Figure 3, the block 33 has holes 33h therethrough in diametrically opposed position adjacent the outer diameter of the groove 33b for receiving screws (not shown) to secure the block to the body 11. The block has the recessed end face thereof confronting a flat side wall of the body 11 and the screws inserted through the holes 33h will clamp the block to the body in sealed relation with the gasket portion 30b of the seal member 30.

The block 33 also has holes 33i in the four corners thereof for a purpose to be hereinafter described.

An O ring 34 is seated in the recess provided by the counterbore 33g of the block 33.

A nipple 35 has a tubular portion 35a thereof projecting into the counterbore 33f of the block in sealing relation with the O ring 34. A flange 35b on the nipple overlies the face of the block around the counterbore 33g thereof and is also in sealing engagement with the O ring 34. The outer end of the nipple has an outturned bead or flange 35c therearound to receive thereover and retain thereon a hose, tube, or the like (not shown).

A cap ring 36 having a bore 36a therethrough freely receiving the tubular portion of the nipple 35 is slipped over this portion. The bore 36a is counterbored at 36b to receive the flange 35a of the nipple and to provide a shoulder 36C overlying the flange around the periphery thereof. Cap screws 37 are passed through holes 36d in the cap ring 36 through the holes 33i of the block 33 and are threaded into tapped holes (not shown) in the body 11 to secure the cap ring to the block and body. The nipple 35 can rotate about its own axis in the cap ring 36 and the O ring 34 will not interfere with this rotation but it will at all times sealingly connect the interior of the nipple with the port provided by the bore 11e of the valve body 11. The cap ring 36 is readily removed from the body 11 and mounting block 33 so that the nipple 35 can be replaced with other appurtenances for the valve 10, such as a closure plug 38 shown in Figure 1. This plug 38 has a pilot portion 38a projecting into the counterbore 33f of the mounting block 33. This pilot portion 38a is of the same diameter as the tubular portion 35a of the nipple 35. A flange 38b is provided on the closure plug 38 similar to the flange 35b on the nipple 35 so that the nipple and closure plug are interchangeable. The closure plug 38 is useful for sealing one of the ports provided by the bores 11e of the valve body 11.

Fluid can flow from a nipple 35 through a selected port provided by a bore 11e of the body into the nipple 20 and thence through the passageway 28 in the valve plug 23. The nipple 35 can be positioned either as shown in Figure 1, or mounted in place of the closure plug 38. The valve thus has right and left-hand connections for selective use as desired in particular installations.

The nipples 20 and 35 can each rotate about their own axes, can be replaced with other appurtenances for the valve, and during such replacement operation the port seal and other operating parts of the valve are not touched. The swivel movement of the nipples and other appurtenances will not produce leakage because the O ring seals for the nipples and other appurtenances accommodate swivel movement without loss of efficiency.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. In a plug valve of the type having a valve body, a rotary valve plug therein, a plurality of ports in said valve body and combination port seals and gaskets in said ports having tubular portions slidable in the ports with active end faces engaging the valve plug and gasket-defining flange portions overlying outer faces of the valve body, the improvement of a combination seal and swivel mounting comprising a mounting block fixedly secured to the valve body, said block having a recessed end face receiving the gasket-defining flange portion of a seal, an axially extending bead around the periphery of said gasket-defining flange portion of the seal, a groove in the recessed end face of the mounting block receiving said bead, and a second groove in the recessed end face of the mounting block for receiving the tubular portion of the seal adjacent the flange portion thereof.

2. In a plug valve of the type having a valve body, a rotary valve plug therein, a port in the valve body, and a sealing sleeve in the port having an active end face for engaging the valve plug and an outturned flange overlying the outer face of the valve body, the improvement of an axially extending bead on the flange portion of the sealing sleeve, a mounting block fixedly secured on the outer face of the valve body having a recessed end face receiving the flange portion of the sealing sleeve and a groove in the recessed end face receiving the bead on the flange portion.

3. In a rotary plug type valve having a port intersecting an end face of the valve, the improvement of a self-adjusting sealing sleeve in the valve port and having a plug-engaging sealing surface on one end and a gasket-forming flange on the other end overlying the end face, said flange having an annular rib formed thereon, and a mounting block carried in firm assembly on the end face and engaging said flange to retain said sealing sleeve in permanent assembly in said valve, said mounting block having an annular recess receiving said rib on said flange, said mounting block having additional recess means formed in concentric alignment with said annular recess to accommodate adjusting movement of said sealing sleeve.

JACOB RUSH SNYDER.
JAMES FREDERICK NORTON.

REFERENCES CITED

The following references are of record in the file of this patent:

UNITED STATES PATENTS

| Number | Name | Date |
|---|---|---|
| 251,019 | Babcock | Dec. 20, 1881 |
| 807,184 | Malnburg | Dec. 12, 1905 |
| 982,446 | Smith | Jan. 24, 1911 |
| 1,661,310 | Schmidt | Mar. 6, 1928 |
| 1,879,481 | Putnam | Sept. 27, 1932 |
| 2,173,949 | Neveu | Sept. 26, 1939 |
| 2,375,633 | Downey | May 8, 1945 |
| 2,383,983 | Melichar | Sept. 4, 1945 |
| 2,417,400 | Snyder | Mar. 11, 1947 |
| 2,441,344 | Bosworth | May 11, 1948 |
| 2,472,652 | Downey | June 7, 1949 |

FOREIGN PATENTS

| Number | Country | Date |
|---|---|---|
| 499,150 | Great Britain | of 1939 |